(12) United States Patent
Drumm et al.

(10) Patent No.: US 8,657,388 B2
(45) Date of Patent: Feb. 25, 2014

(54) BRAKE SYSTEM FOR MOTOR VEHICLES

(75) Inventors: Stefan A. Drumm, Saulheim (DE); Lothar Schiel, Hofheim (DE)

(73) Assignee: Continental Teves AG & Co. oHG (DE)

( * ) Notice: Subject to any disclaimer, the term of this patent is extended or adjusted under 35 U.S.C. 154(b) by 349 days.

(21) Appl. No.: 12/743,658

(22) PCT Filed: Nov. 20, 2008

(86) PCT No.: PCT/EP2008/065889
§ 371 (c)(1),
(2), (4) Date: May 19, 2010

(87) PCT Pub. No.: WO2009/065884
PCT Pub. Date: May 28, 2009

(65) Prior Publication Data
US 2010/0253135 A1  Oct. 7, 2010

(30) Foreign Application Priority Data

Nov. 21, 2007 (DE) .......................... 10 2007 055 515
Nov. 19, 2008 (DE) .......................... 10 2008 058 240

(51) Int. Cl.
*B60T 8/44* (2006.01)

(52) U.S. Cl.
USPC ........ 303/114.1; 303/15; 303/115.4; 188/358

(58) Field of Classification Search
USPC .............. 303/3, 15, 155, 114.1, 116.1, 115.1, 303/115.4, 115.5, 113.1; 60/545, 555, 60/547.1; 188/358
See application file for complete search history.

(56) References Cited

U.S. PATENT DOCUMENTS

| | | | |
|---|---|---|---|
| 4,244,186 A | 1/1981 | Mehren | |
| 6,247,762 B1 | 6/2001 | Kusano et al. | |
| 2008/0257670 A1 | 10/2008 | Drumm et al. | |
| 2008/0258546 A1 | 10/2008 | Drumm et al. | |

FOREIGN PATENT DOCUMENTS

| | | |
|---|---|---|
| DE | 27 25 941 A1 | 12/1978 |
| DE | 43 22 292 A1 | 1/1995 |
| DE | 199 58 304 A1 | 6/2000 |
| DE | 10 2005 005 391 A1 | 9/2005 |
| DE | 10 2006 015 906 A1 | 7/2007 |
| EP | 0 267 018 A2 | 5/1988 |
| WO | WO 2006/042823 A1 | 4/2006 |
| WO | WO 2007/031398 A1 | 3/2007 |

*Primary Examiner* — Bradley King
*Assistant Examiner* — Vu Q Nguyen
(74) *Attorney, Agent, or Firm* — RatnerPrestia

(57) ABSTRACT

A brake system for motor vehicles having a brake master cylinder that can be operated by a brake pedal, a fluid reservoir assigned to the brake master cylinder, a hydraulic booster stage which is operatively connected to the inlet side of the brake master cylinder, with a booster piston which is subjected to a hydraulic boost pressure supplied by a pressure source and which in all operating modes allows a direct mechanical action by the brake pedal on a hydraulic piston of the brake master cylinder, and having an electrically controllable pressure regulating valve arrangement for metering the boost pressure. In order to provide a brake system of simple design, which is cost-effective to produce and which functions reliably, the pressure regulating valve arrangement can be hydraulically controllable.

18 Claims, 2 Drawing Sheets

BRAKE SYSTEM FOR MOTOR VEHICLES

This application is the U.S. national phase application of PCT International Application No. PCT/EP2008/065889, filed Nov. 20, 2008, which claims priority to German Patent Application No. 10 2007 055 515.8, filed Nov. 21, 2007, and German Patent Application No. 10 2008 058 240.9, filed Nov. 19, 2008, the contents of such applications being incorporated by reference herein.

FIELD OF THE INVENTION

The invention relates to a brake system for motor vehicles, having a brake master cylinder that can be operated by means of a brake pedal, a fluid reservoir assigned to the brake master cylinder, a hydraulic booster stage, which is operatively connected to the inlet side of the brake master cylinder, with a booster piston which is subjected to a hydraulic boost pressure supplied by a pressure source and which in all operating modes allows a direct mechanical action by the brake pedal on a hydraulic piston of the brake master cylinder, and having an electrically controllable pressure regulating valve arrangement for metering the boost pressure.

BACKGROUND OF THE INVENTION

Such an electro-hydraulic brake system is disclosed by the unexamined German application DE 27 25 941, which is incorporated by reference. In the known brake system the hydraulic booster stage is connected to the inlet side of a pedal-operatable brake booster. A 3/2-way directional control valve, which is electrically controlled, serves as pressure regulating valve arrangement for regulating the hydraulic boost pressure. A feature of the known brake system that has been found to be less advantageous are the facts that in addition to the arrangement mentioned for generating an electrically controlled brake servo assistance, the pneumatic brake booster has to be used in order to afford brake servo assistance in the absence of electrical control. Two brake boosters, one electrical and one pneumatic, are used connected in series.

On the basis of the aforementioned use of a pedal-operatable brake booster and an electrically operatable brake booster, an object of the invention is to produce such a brake system having only one brake booster, which is both pedal-operatable and electrically operatable.

SUMMARY OF THE INVENTION

According to aspects of the invention this object is achieved in that the pressure regulating valve arrangement can also be hydraulically controlled. The hydraulic control pressure corresponds to the pedal force, so that the pedal-operated brake booster connected on the input side is no longer needed.

The idea of the invention is embodied in that the pressure regulating valve arrangement is hydraulically controlled by means of the pressure generated by the brake master cylinder.

It is particularly advantageous here if the pressure regulating valve arrangement is of two-stage design.

In a development of the invention a substantial simplification of the construction of the boost pressure control is achieved in that the pressure regulating valve arrangement comprises an electrically controllable pilot control stage, a double-hydraulically controllable pilot control stage and a double-hydraulically controllable valve main stage.

In such an embodiment it is particularly advantageous if the pilot control stage is formed by the connection in series of an analog controllable 2/2-way directional control valve, closed when de-energized, and an analog controllable 2/2-way directional control valve, open when de-energized, the hydraulic center tap between the two valves delivering one of the control pressures for the valve main stage. The use of tried and tested electronic components ensures high operating reliability.

In a further embodiment of the subject matter of the invention a considerable increase both in the control performance and in the dynamics of the aforementioned boost pressure control is achieved in that the valve main stage comprises a 3/3-way directional control valve having a valve sleeve, a valve body axially displaceable in the valve sleeve, a first control piston and a second control piston, the first control piston defining a first hydraulic control chamber, the first and the second control pistons defining a second hydraulic control chamber, the second control piston and the valve body defining a hydraulic reservoir connecting chamber and the valve body and the valve sleeve defining a high-pressure connecting chamber and a working pressure connecting chamber.

An outstanding feature of an especially compact embodiment of the subject matter of the invention is that the valve body and the second control piston are integrally formed.

In another advantageous development of the invention the valve body on its end face remote from the second control piston projects into the working pressure connecting chamber and is subjected to the pressure of the high-pressure connecting chamber.

In a further embodiment of the subject matter of the invention a faultless hydraulic control of the aforementioned valve main stage is achieved in that the second control chamber is hydraulically connected to a center tap of the pilot control stage.

A further possibility for hydraulic control of the pressure regulating valve is to connect the first control chamber hydraulically to a hydraulic circuit of the brake master cylinder.

In an especially reliably functioning design variant of the subject matter of the invention the valve body, interacting with the valve sleeve, in a rest position establishes a hydraulic connection between the working pressure connecting chamber and a reservoir connecting chamber, the hydraulic passage cross section of which diminishes continuously under the application of a displacement travel of the valve body in the valve sleeve, and the valve body (14) in further displacement by a slight "overlap travel" separates the three connecting chambers from one another, before under yet further displacement continuously opening a hydraulic connection between the high-pressure connecting chamber and the working pressure connecting chamber.

In a further development of the subject matter of the invention the first control piston is embodied as a stepped piston.

For faultless functioning of the pressure regulating valve it is particularly appropriate if an annular hydraulic chamber between the two sealing cross-sections of the stepped piston is hydraulically connected to the reservoir connecting chamber.

A further advantage of the invention is that the pedal-controlled component of the brake servo assistance can be deactivated by separating the hydraulic connection between the brake master cylinder and the pressure regulating valve. In another design variant such a separation between the brake master cylinder and the pressure regulating valve is ensured in that the connection between the brake master cylinder and the first control chamber can be shut off by means of an electro-magnetically operatable 2/2-way directional control valve, open when de-energized, a non-return valve being provided, which is operatively connected in parallel to this valve and which allows a fluid volumetric flow leaving the first control chamber irrespective of the switching position of the 2/2-way directional control valve, open when de-energized.

For the aforementioned hydraulic control of the pressure regulating valve by the inlet pressure in the brake master cylinder it is particularly advantageous if the end face of the valve body facing the working pressure connecting chamber is larger than the face of the stepped piston defining the first control chamber.

In another preferred embodiment of the invention a hydraulic connection, in which a non-return valve closing towards the fluid reservoir is inserted, is provided between the working pressure connecting chamber and the fluid reservoir.

Finally, reliable registering of the driver's intended declaration is achieved in that a pressure sensor is provided for registering the inlet pressure in the brake master cylinder.

A redundant registration of the driver's intended deceleration is ensured in that a travel sensor is provided for registering the travel of the booster piston.

BRIEF DESCRIPTION OF THE DRAWINGS

The invention is best understood from the following detailed description when read in connection with the accompanying drawings. Included in the drawings is the following Figures.

DETAILED DESCRIPTION OF THE PREFERRED EMBODIMENTS

Figure 1:
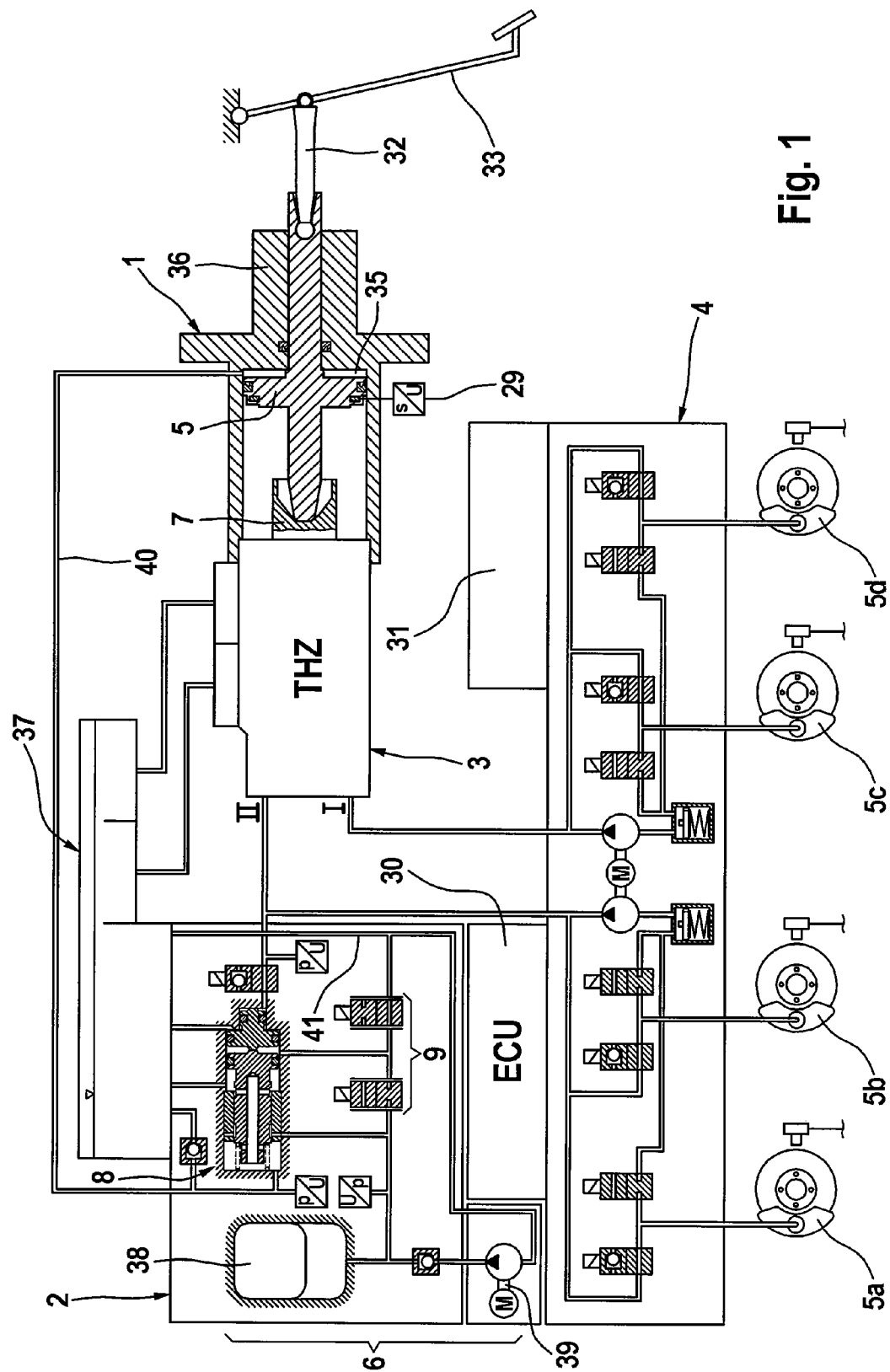
FIG. 1 shows the construction of one embodiment of the brake system according to aspects of the invention.

The brake system according to aspects of the invention represented in FIG. 1 substantially comprises an operating device 1, a hydraulic control unit 2, the operating device 1 and the control unit 2 forming a brake booster, and a brake master cylinder or tandem master cylinder 3, which is operatively connected to the output side of the brake booster and the pressure chambers (not shown) of which are connected to wheel brake circuits I, II, which by way of a known ABS/ESP hydraulic unit or a controllable wheel brake pressure modulating module 4 supply the wheel brakes 5a-d of a motor vehicle with hydraulic fluid. An electronic brake system control unit 30 is assigned to the hydraulic control unit 2, whilst an electronic control and feedback unit 31 is assigned to the wheel brake pressure modulation module 4. The brake operating unit 1 is controlled through the provision of a brake pedal 33, which is coupled to a piston rod 32, which by way of a booster piston 5 has a force-transmitting connection to a first piston or primary piston 7 of the brake master cylinder 1. The booster piston 5 is guided so that it is axially displaceable in a booster housing 36, where it defines a hydraulic booster chamber, which is provided with the reference numeral 35.

The aforementioned hydraulic control unit 2 substantially comprises a pressurizing device 6 and a pressure regulating valve arrangement 8. The pressurizing device 6 is formed by a hydraulic high-pressure accumulator 38 and a motor-pump unit 39 for charging the high-pressure accumulator 38, whilst the output of the pressure regulating valve arrangement 8 is connected on the one hand by a hydraulic connection 25 to the aforementioned fluid reservoir 37 and on the other via a line 40 attaching to the hydraulic connection 25 to the booster chamber 35. The hydraulic control unit 2 furthermore has a pilot control stage 9, the function of which will be explained in the following text, assigned to the pressure regulating valve arrangement 8. A further line 41 connects the suction side of the motor-pump unit 39 to the aforementioned fluid reservoir 37. The motor-pump unit 39 is preferably embodied as a module remote from the other components of the hydraulic control unit 2 and is equipped with fastenings and hydraulic connections that isolate any structure-borne noise. The hydraulic pressure held ready in the high-pressure accumulator 38 is registered by a pressure sensor, which is provided with the reference numeral 45.

As can be seen in particular from FIG. 2, the pressure regulating valve arrangement 8 is of two-stage design and besides said electrically controllable pilot control stage 9 preferably comprises a double-hydraulically controllable valve main stage, which is provided with the reference numeral 10, and a hydraulic control stage, the construction of which will be explained in the following description.

In a series connection the pilot control stage 9 comprises an analog controllable 2/2-way directional control 11 valve, closed when de-energized, and an analog controllable 2/2-way directional control valve 12, open when de-energized, the hydraulic center tap 28 between the two valves 11, 12 delivering one of the control pressures for the valve main stage 10. The hydraulic control stage is formed by a first control chamber 17, a first control piston or stepped piston 15, an annular chamber 22 connected to the fluid reservoir 37, and a second control chamber 18, which is defined by the stepped piston 15 and which among other things is connected to the aforementioned center tap 28 of the pilot control stage 9. The second control chamber 18 is defined on the other side by a second control piston 16, which together with a valve sleeve 13 defines a reservoir connecting chamber 19 and which in the embodiment shown is integrally formed with a valve body 14. The valve sleeve 13 together with the valve body 14 forms the aforementioned main stage 10 of the pressure regulating valve arrangement 8.

Figure 2:
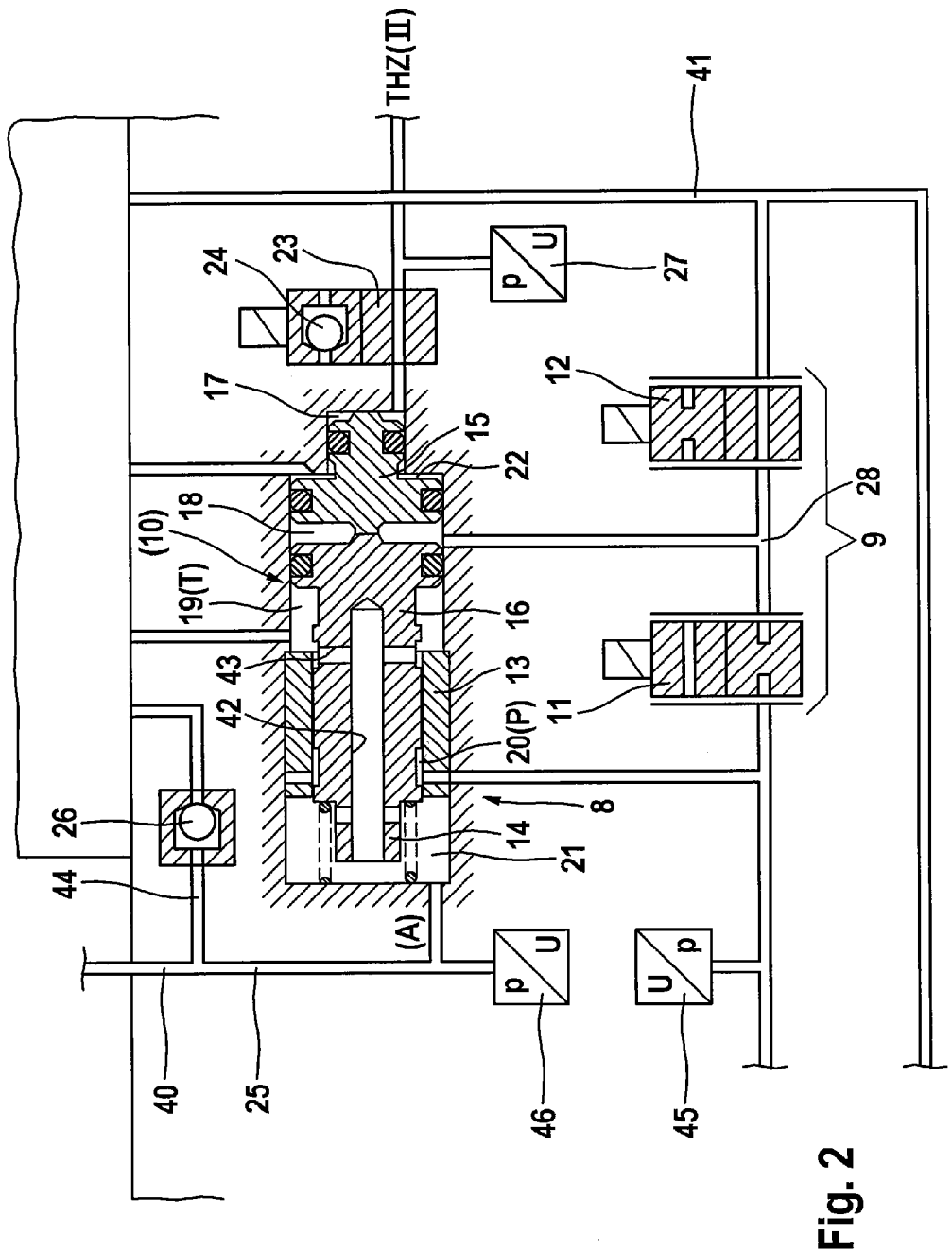
FIG. 2 shows the construction of a pressure regulating valve that can be used in the embodiment according to FIG. 1 on a larger scale.

It can further be seen from FIG. 2 that the first control chamber 17 is connected by way of an electromagnetically operatable, 2/2-way directional control valve 23, open when de-energized, to the second brake circuit II. The inlet pressure in the second brake circuit is registered by a pressure sensor 27, the 2/2-way directional control valve 23 in its energized switching position fulfilling the function of a non-return valve closing towards the control stage, which is indicated in FIG. 2 by the corresponding, hydraulic symbol provided with the reference numeral 24.

Meanwhile the valve body 13 together with the valve sleeve 13 forms a high-pressure connecting chamber 20, which is connected to the outlet of the pressurizing device 6 or 38. The high-pressure connecting chamber 20 can be connected by a displacement of the valve body 14 to a working pressure chamber 21, which in the starting position or rest position of the valve body shown is connected to the reservoir connecting chamber 19 by means of fluid ducts 42, 43 formed in the valve body 14. The inlet boost pressure in the working pressure chamber 21 is registered by a third pressure sensor 46. It is advantageous here if the diameter of the valve body 14 guided in the valve sleeve 13 is greater than the diameter of the smaller step of the stepped piston 15. It can be seen from FIG. 2, moreover, that the line 40 leading to the booster chamber 35 is connected to the working pressure chamber 21 (via the aforementioned connecting line 25) and that a further line 44 leading to the fluid reservoir 37 is connected to this former line. Also connected to the latter aforementioned line 44 is a non-return valve 26 closing towards the fluid reservoir 37.

The operating principle of the brake system according to aspects of the invention will be explained in more detail below in conjunction with the drawing.

The first operating mode corresponds to a purely electrical, the so-called "brake-by-wire" operating mode, in which all components of the brake system are intact and functioning correctly. This corresponds to the nominal function of the brake system according to aspects of the invention. In this mode the valve 23 is closed and, in order to adjust the hydraulic pressure in the booster chamber 35 needed for instantaneous braking the pressure regulating valve arrangement 8 is controlled in such a way that the valve 12 is closed in order to boost the pressure, the valve 12 is opened so that fluid flows into the chamber 18, thereby causing the valve body 16 to move, with the result that the pressure reduction control edge, that is to say the connection from the working pressure chamber 21 to the reservoir connecting chamber 18, is closed and with further inflow the connection between the high-pressure connecting chamber 20 and the working pressure connecting chamber 21 is opened. To maintain pressure, metered opening of the valve 12 allows a partial outflow of fluid from the chamber 18, so that the valve body 16 is displaced towards the right and the pressure build-up control edge, that is to say the connection from the high-pressure connecting chamber 20 to the working pressure connecting chamber 21 is shut off, whilst to reduce pressure through a further outflow of fluid from the chamber 18 the valve body 16 is displaced further towards the right, with the result that the pressure reduction control edge, that is to say the connection between the working pressure connecting chamber 21 and the reservoir connecting chamber 19 is opened.

The process of controlling the analog controllable 2/2-way directional control valves 11, 12 is coordinated by the electronic control unit 30, in such a way that the pressure in the working pressure connecting chamber 21 is brought into line with a set-point value. This set-point value results on the one hand from a registered operating component of the brake pedal 33 and on the other from a remote operating component. The operating component of the brake pedal 33 is determined from the operating travel of the brake pedal 33 or the booster piston 5, which is registered by means of the travel sensor 29 and which according to a preferably progressive characteristic curve is adjusted as a consequence of an operating force exerted on the brake pedal 33 in a relationship which by virtue of the progression is not proportional.

In a second operating mode, which is characterized by a voltage drop on the vehicle electrical system and which corresponds to a first return level, an electronically controlled pressure build-up in the working pressure connecting chamber 21 is not possible. For this purpose the pressure regulating valve arrangement 8 is hydraulically controlled by means of the inlet pressure 35 in the brake master cylinder 3 due to the operation of the brake pedal 33, the control by hydraulic means ensuing via the open solenoid valve 23 and the pressure chamber 17, and the fluid stored under pressure in the high-pressure accumulator 38 being used as energy source. Otherwise pressure is built up in the working pressure connecting chamber 21 in the same way as in the first operating mode.

In a third operating mode, which is characterized by the absence of a pressure generated by the hydraulic pressurizing device 6 or 38, the brake system can be operated purely mechanically. Under the influence of brake pedal operation, the booster piston 5 moves from its limit stop towards the left and displaces the brake master cylinder piston 7 through mechanical contact. In the process the non-return valve 26 allows a further flow of fluid from the reservoir 37 into the booster chamber 35. The brake master cylinder 3 is operated solely by the muscle power of the driver of the vehicle.

The present invention affords a brake system of simple construction, in which an electronic stability control function (ESP) can be more easily implemented than in conventional brake systems, because there is no need for special ESP hydraulics. In vehicles with the brake system according to aspects of the invention, special ESP hydraulics are superfluous—the remote brake hydraulics according to aspects of the invention in conjunction with a conventional ABS-System produces a far better function. Fewer electromagnetically operatable valves are needed than are required for conventional ESP hydraulics. Furthermore, the brake system according to aspects of the invention has a better energy balance and generates less noise than conventional ESP hydraulics, because there is no longer any need, in ESP mode to pump brake fluid around in order to generate dynamic pressure on a pressure-limiting valve.

The invention claimed is:

1. A brake system for motor vehicles comprising:
   a brake master cylinder that can be operated by a brake pedal,
   a fluid reservoir assigned to the brake master cylinder,
   a hydraulic booster chamber which is operatively connected to an inlet side of the brake master cylinder, with a booster piston which is subjected to a hydraulic boost pressure supplied by a pressure source and which in all operating modes allows a direct mechanical action by the brake pedal on a hydraulic piston of the brake master cylinder,
   a brake circuit operatively connected to an outlet side of the brake master cylinder, and
   a pressure regulating valve arrangement for metering a boost pressure, the pressure regulating valve arrangement directly hydraulically connected to the brake circuit, wherein the pressure regulating valve arrangement is electrically controllable in a first operating mode and is hydraulically controllable in a second operating mode,
   wherein the pressure regulating valve arrangement includes an electrically controllable pilot control stage comprising a pair of control valves and a hydraulic center tap between the pair of control valves, the center tap directly hydraulically connected with a control chamber of the pressure regulating valve arrangement, the control chamber defined between a pair of control pistons within the pressure regulating valve arrangement.

2. The brake system as claimed in claim 1, wherein the pressure regulating valve arrangement is hydraulically controlled by a pressure generated by the brake master cylinder.

3. The brake system as claimed in claim 1, wherein the pressure regulating valve arrangement is a two-stage design.

4. The brake system as claimed in claim 3, wherein the pressure regulating valve arrangement further includes a valve main stage controllable via a plurality of hydraulic connections.

5. The brake system as claimed in claim 4, wherein the pilot control stage is formed by a connection in series of an analog controllable 2/2-way directional control valve, which is closed when de-energized, and an analog controllable 2/2-way directional control valve, which is open when de-energized, wherein a hydraulic center tap between the two control valves delivers a pressure from one of the two control valves for the valve main stage.

6. The brake system as claimed in claim 1 further comprising a hydraulic connection, in which a non-return valve closing towards the fluid reservoir is positioned, provided between a working pressure connecting chamber and the fluid reservoir.

7. The brake system as claimed in claim 1 further comprising a pressure sensor for registering an inlet pressure in the brake master cylinder.

8. The brake system as claimed in claim 1 further comprising a travel sensor for registering a travel of the booster piston.

9. A brake system for motor vehicles comprising:
a brake master cylinder that can be operated by a brake pedal,
a fluid reservoir assigned to the brake master cylinder,
a hydraulic booster chamber which is operatively connected to an inlet side of the brake master cylinder, with a booster piston which is subjected to a hydraulic boost pressure supplied by a pressure source and which in all operating modes allows a direct mechanical action by the brake pedal on a hydraulic piston of the brake master cylinder, and
a pressure regulating valve arrangement for metering a boost pressure,
wherein the pressure regulating valve arrangement comprises a 3/3-way directional control valve having a valve main stage and a hydraulic control stage, the valve main stage comprising a valve sleeve and a valve body axially displaceable in the valve sleeve, whilst the hydraulic control stage comprises a first control piston and a second control piston, the first control piston defining a first hydraulic control chamber, the first control piston and the second control piston defining a second hydraulic control chamber, the second control piston and the valve body defining a hydraulic reservoir connecting chamber and the valve body and the valve sleeve defining a high-pressure connecting chamber and a working pressure connecting chamber.

10. The brake system as claimed in claim 9, wherein the valve body and the second control piston are integrally formed.

11. The brake system as claimed in claim 9, wherein the valve body on its end face remote from the second control piston projects into the working pressure connecting chamber and is subjected to a pressure of the high-pressure connecting chamber.

12. The brake system as claimed in claim 9, wherein the second control chamber is hydraulically connected to a center tap of the pilot control stage.

13. The brake system as claimed in claim 9, wherein the first hydraulic control chamber is hydraulically connected to a hydraulic circuit of the brake master cylinder.

14. The brake system as claimed in claim 9, wherein the valve body, interacting with the valve sleeve, in a rest position establishes a hydraulic connection between the working pressure connecting chamber and the reservoir connecting chamber, a hydraulic passage cross section of which diminishes continuously under an application of a displacement travel of the valve body in the valve sleeve, and wherein the valve body in further displacement by a slight overlap travel separates all three connecting chambers from one another, before under yet further displacement continuously opening a hydraulic connection between the high-pressure connecting chamber and the working pressure connecting chamber.

15. The brake system as claimed in claim 9, wherein the first control piston is embodied as a stepped piston.

16. The brake system as claimed in claim 15, wherein an annular hydraulic chamber between two sealing cross sections of the stepped piston is hydraulically connected to the reservoir connecting chamber.

17. The brake system as claimed in claim 15, wherein an end face of the valve body facing the working pressure connecting chamber is larger than a face of the stepped piston defining the first control chamber.

18. The brake system as claimed in claim 9, further comprising:
an electromagnetically operable 2/2-way directional control valve that is configured for shutting a connection between the brake master cylinder and the first control chamber, wherein the electromagnetically operable 2/2-way directional control valve is open when de-energized, and
a non-return valve which is operatively connected in parallel to the electromagnetically operable 2/2-way directional control valve and which allows a fluid volumetric flow leaving the first control chamber irrespective of a switching position of the 2/2-way directional control valve.

* * * * *